United States Patent [19]
Shulick

[11] 3,880,120
[45] Apr. 29, 1975

[54] ROTARY COUPLING
[75] Inventor: Robert J. Shulick, St. Charles, Ill.
[73] Assignee: Babson Bros. Co., Oak Brook, Ill.
[22] Filed: Oct. 19, 1973
[21] Appl. No.: 407,979

[52] U.S. Cl. .............................. 119/14.04; 285/281
[51] Int. Cl. ............................................... A01j 7/00
[58] Field of Search ......... 119/14.04; 285/281, 336, 285/354, 356

[56] References Cited
UNITED STATES PATENTS
| | | | |
|---|---|---|---|
| 2,316,065 | 4/1943 | Hapgood | 119/14.04 |
| 2,705,651 | 4/1955 | Myers | 285/281 |
| 3,261,323 | 7/1966 | Steelhammer | 119/14.04 |

*Primary Examiner*—Hugh R. Chamblee
*Attorney, Agent, or Firm*—Wegner, Stellman, McCord, Wiles & Wood

[57] ABSTRACT

An improved rotary coupling for use in milking parlors of the type including a rotating table for receiving the cows and having a plurality of miling stations thereat whereat the cows can be milked as the table rotates. The coupling is included in a take-off line for conveying the milk from the table to a point further processing and includes complementary male and female members with flush seals so that the line may be easily cleaned for sanitation purposes simply by passing a stream of water therethrough.

6 Claims, 2 Drawing Figures

PATENTED APR 29 1975   3,880,120

ROTARY COUPLING

BACKGROUND OF THE INVENTION

This invention relates to rotary couplings and, more particularly, rotary couplings that may be employed in food processing, particularly, the handling of milk. More specifically, the rotary coupling of the present invention is intended to be interposed between a movable conduit for receiving milk from cows being milked on a rotary milking table and for directing the same to a fixed conduit through which the milk may be passed to a point of further processing.

Representative prior art with respect to such milking systems includes Bott U.S. Pat. No. 3,095,854 and Steelhammer U.S. Pat. NO. 3,261,323. Representative prior art rotary couplings per se are disclosed by Vandergrift U.S. Pat. No. 1,638,224; Haskell U.S. Pat. No. 1,235,798; and Boitnott U.S. Pat. No. 2,726,104.

Agriculture, like many other fields of endeavor, is experiencing a vast upsurge in the number of large scale operations for the purpose of maximizing efficiency. Dairying is no exception. Herd sizes have increased substantially, with the result that there has been an increased need for mechanization of various dairying operations.

One type of mechanization being increasingly employed is the use of rotary milking parlors wherein a large, rotatable table, is provided with a plurality of milking stalls or positions and cows to be milked are received on the table and directed to a milking position and milked out as the table rotates between entrance and exit positions. As alluded to previously, the general nature of such systems is disclosed by Bott and Steelhammer identified above.

Of course, since the cows are rotating with the table and the milk must be taken from the table and moved to a point of further processing, which may merely be a bulk tank, provision must be made for conveying the stream of milk from the moving table to the stationary structure, such as the aforementioned bulk tank. Once method of accomplishing such milk conveying is through the provision of a conduit system mounted on the table for receiving milk from the milkers attached to the cows on the table, which conduit is associated with a rotary coupling, which in turn is connected to a fixed conduit wherethrough the milk may be directed to the bulk tank or the like.

A variety of rotary couplings can be employed for the purpose, but each presents difficulties in terms of maintaining the sanitation of the system. As is well known, milking systems must be cleansed after each use in order to preclude a proliferation of bacteria in the milk residue left in the system which would lead to contamination of milk produced by subsequent milking operations. While flushing the system with water will remove the vast majority of residue, prior art rotary couplings frequently have provided a haven for milk residue that cannot be easily flushed therefrom.

For example, in the Vandergrift coupling, the innerface of two coupling members defines a dead space into which milk may flow and cannot be easily flushed therefrom. The Haskell coupling is similarly deficient. Other couplings, such as that off Boitnott, are unsatisfactory in that they permit virtually unlimited axial deviation of one coupling component to the next which can create dead spots between the seals and the coupling members, from which residue cannot easily be flushed.

SUMMARY OF THE INVENTION

It is the principal object of the invention to provide a new and improved milk conveying system in connection with a rotary milking parlor, which system includes an improved rotary coupling. More specifically, it is an object of the invention to provide such a system wherein the rotary coupling is free from crevices or dead spots wherein milk residue could accumulate and not be easily flushed and which includes structure for precluding any substantial axial deviation that could open residue receiving crevices between coupling members and seals.

The exemplary embodiment of the invention achieves the foregoing object in a structure including male and female coupling members. Each includes a central passage which are of identical diameters. The female coupling member further includes a male member receiving cavity defined by a radially outwardly extending wall and an annular enlarged side wall. The male coupling member includes an end that extends radially outwardly from the passage and an outer annular surface of just slightly less diameter than the diameter of the interior annular surface of the female coupling member. An annular seal is disposed between and sealingly engaged by the radially extending surfaces of both the male and female member and the seal has an interior passage that is identical in diameter to the diameter of the passages in both the male and female coupling members. Thus, there are no crevices at the interface of the coupling members and the seal in which milk residue could collect.

The relationship of the annular walls of the male and female coupling members is such that after only a slight, but tolerable, axial deviation of one with respect to the other, the annular wall of the female coupling member will engage the annular wall of the male coupling member to preclude further axial deviation. The allowable axial deviation is sufficiently small that crevices cannot be opened up between the seal and the coupling members at their interface.

In a highly preferred embodiment, the male and female coupling members are butt welded to stainless steel tubing of a thin walled construction which have an interior diameter equal to the diameter of the passages. Through the use of such thin walled conduits, forces tending to cause axial deviation are taken up through deflection of the conduits rather than being fully applied to the rotary coupling.

Other objects and advantages will become apparent from the following specification taken in conjunction with the accompanying drawings.

DESCRIPTION OF THE PREFERRED EMBODIMENT

Figure 1:
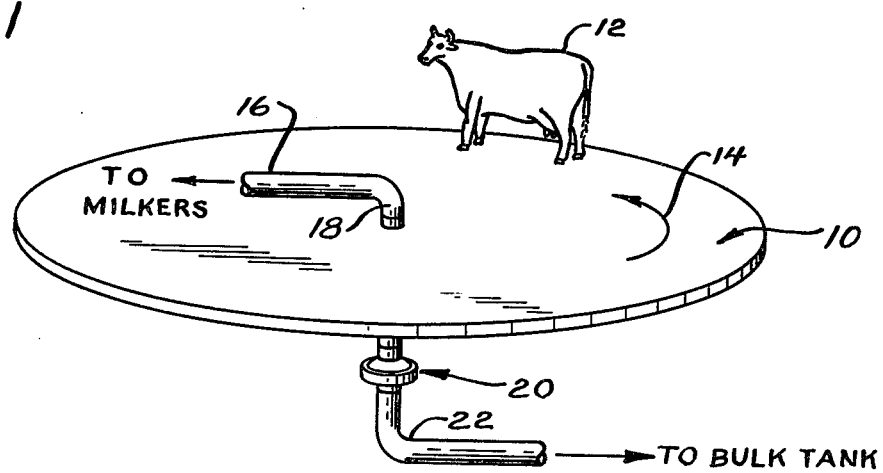
FIG. 1 is a somewhat schematic, perspective view of a rotary milking parlor embodying the milk conveying system made according to the invention.

An exemplary embodiment of a milking parlor made according to the invention is illustrated in FIG. 1 and is seen to include a circular platform, generally designated 10, capable of receiving one or more cows 12 in a plurality of milking stalls (not shown) thereon. Means, not shown, cause the platform 10 to rotate in the direction of an arrow 14 to move the cows sequentially between an entrance and exit position to and from the platform 10 so that they may be milked during the interim. Suitable support means are also provided for rotatably mounting the platform 10. Since such components are known in the art, they need not be described herein.

Centrally within the platform 10 and coincident with the axis of rotation of the same is a conduit 16 which rotates with the platform 10 and which may be connected in any conventional fashion to the milkers employed in milking the cows 12 on the platform 10. The conduit 16 includes a downwardly directed extension 18 which is connected to a rotary coupling, generally designated 20. the rotary coupling 20, in turn, is connected to a fixed conduit 22 which may lead to a further processing point such as a bulk tank. Thus, milk from the cows 12 is passed through the conduit 16, the rotary coupling 20 and the conduit 22 during the milking process as the platform 10 is rotated.

Figure 2:
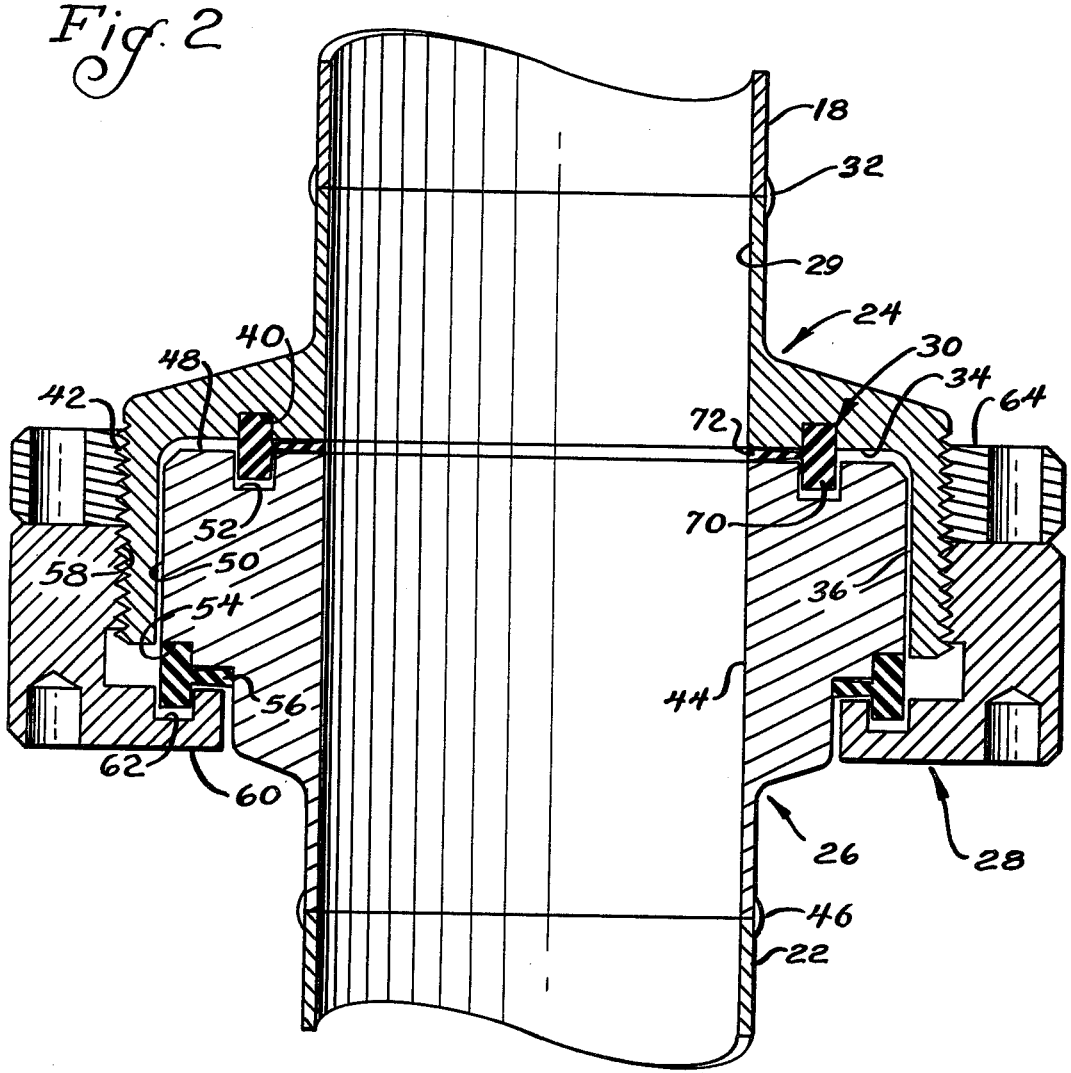
FIG. 2 is a sectional view of the rotary coupling employed in the inventive system.

Turning now to FIG. 2, the coupling 20 will be described in greater detail. The same consists of a female coupling member, designated 24, a male coupling member, generally designated 26, a spanner nut, generally designated 28, for securing the male and female coupling members 26 and 24, respectively, together for relative rotation, and at least one annular seal, generally designated 30.

The female coupling member 24 includes an internal passage 29 having the same diameter as the interior of the downturned end 18 of the conduit 16. The two are butt welded together as at 32. The passage 29 terminates opposite the downturned end 18 in a radially outwardly extending wall 34 which, in turn, merges into an annular interior wall 36. As a result, an enlarged cavity is defined for receiving the male coupling member 26 as illustrated in FIG. 2.

The radial wall 34 may include an annular recess 40 for receipt of the seal 30. Finally, the exterior of the female coupling member 24 opposite the annular interior wall 36 is threaded as at 42.

The male coupling member 26 also includes an interior passage 44 which is of the same diameter as the interior of passage 29. One end of the male coupling member is connected to the conduit 22, which also has the same interior diameter as the passage 44, by means of a butt weld 46. The end of the male coupling member 26 opposite the butt weld 46 includes a radially outwardly extending surface 48 and adjacent thereto is an annular cylindrical outer surface 50. As can be seen in FIG. 2, the annular outer surface 50 of the male coupling member 26 and the annular interior surface 36 of the female coupling member 24, have a substantial longitudinal extent and have almost identical diameters, with the diameter of the male coupling member being just slightly less than the diameter of the wall 36. In a preferred embodiment, the spacing is on the order of 5 - 10 mils.

The male coupling member 26 also includes, in the radially outwardly extending wall 48, an annular recess 52 for receipt of the seal 30. Oppositely from the recess 52 is an annular stepped formation 54 for receipt of a second seal 56

The spanner nut 28 includes an enlarged, interiorly threaded section 58 for threaded engagement with the threads 42 on the female coupling member 24. A lesser diameter inwardly extending flange 60 is also provided and the same is constructed so as to underlie the outermost dimension of the male coupling member 26. The flange 60 is provided with an annular interior groove 62 which also receives the seal 56. Thus, the spanner nut 28 is operative to hold the male and female coupling members in assembled relation for relative rotary movement. If desired, a lock nut 64 may be employed in connection with the spanner nut 28.

Turning now to the seal 30, the same is an annular ring any section of which is T-shaped. The "top" 70 of the T is received in the annular grooves 40 and 52 to firmly locate the seal 30 in the desired relation between the male and female coupling members. The upright 72 extends radially inwardly to terminate abruptly at the face of the interior of the fluid passage defined by the passages 29 and 44. That is, the seal 30 has an interior passage having the same diameter as the passages 29 and 44.

As can be seen from FIG. 2, wherein the coupling parts are not fully tightened upon each other, the upright 72 is of increasing width as the passages 29 and 44 are approached. This allows for some compression of the same at its point of emergence into the passages 29 and 44 and due to the inherent resiliency of the seal 30, if one of the coupling elements is canted relative to the other, the fact that there is such compression will permit the seal to decompress and immediately fill any void that might be posed by such canting.

The seal 56 is generally similar to the seal 30 except, as seen in FIG. 2, the base of the upright abuts an outer surface of the male coupling member 26 rather than being aligned with the walls of the passages 29 and 44.

As a last structural characteristic of the invention, it is preferred that the conduits 16 and 22 be relatively thin walled, such as 16 or 18 gauge, so as to be capable of substantial deflection without rupture.

In use, the coupling shown in FIG. 2 will be tightened substantially by advancing the spanner nut on the threads 42 from the position shown so that the seals 30 and 56 are firmly held in place. The seals 30 and 56 provide a bearing surface for the various components so that the female coupling member 24 may be rotated with the platform 10 relative to the male coupling member 26, which will be stationary with the conduit 22. Should it occur that the platform 10 cants, it will be realized that because of the length of the walls 36 and 50 on the coupling members, before substantial axial displacement can occur, the lower end of the female coupling member 24 and, specifically, a lowermost portion of the wall 36, will contact a lowermost portion of the wall 50 on the male coupling member 26. As a result, only limited axial displacement is permitted and by reason of the construction of the seal 30, as mentioned above, no crevice will open between the seal and its points of sealing engagement with the radial walls 34 and 48 of the two coupling members. Moreover, because of the use of thin walled tubing, the forces of such canting can be dissipated within the conduits 18 and 22 by reason of their ability to readily flex.

It will be appreciated that a milking system made according to the invention eliminates crevices or dead spaces that could receive milk and hold the same even after repeated washing to the point of providing a haven for bacterial growth. As a result, the system maximizes efficiency of a dairying operation in that the health hazards are minimized and cleaning operations are relatively simple.

I claim:

1. In a milking parlor including a rotary table for receiving and supporting cows during the milking thereof, a conduit rotatable with said table for receiving milk from the cow being milked thereon, a fixed conduit for receiving milk and directing the same to a point for further processing, and a rotary joint interconnecting said conduits whereby the first may rotate relative to the second and with the table, the improvement wherein said rotary joint comprises: a male coupling member in fluid communication with one of said conduits; a female coupling member in fluid communication with the other conduits and coaxially receiving said male member; an annular seal embracing the end of said male member remote from the conduit with which it is in fluid communication and the interior of said female coupling member; means interconnecting said male and female coupling members for relative rotary movement; and a further annular seal interposed between an exterior surface of said male coupling member and said interconnecting means; said female coupling member, male coupling member and said first mentioned annular seal having coaxial fluid passages of substantially identical diameter.

2. In a milking parlor including a rotary table for receiving and supporting cows during the milking thereof, a conduit rotatable with said table for receiving milk from the cow being milked thereon, a fixed conduit for receiving milk and directing the same to a point for further processing, and a rotary coupling interconnecting said conduits whereby the first may rotate relative to the second and with the table, the improvement wherein said rotary coupling includes: a female coupling member in fluid communication with one of said conduits, said female coupling member including an interior passage through which milk may flow, a radially extending surface extending radially outwardly of said passage and an annular interior side wall; a male coupling member secured to the other of said conduits, said male coupling member including an interior passage through which milk may pass; a radial surface at one end thereof extending radially outwardly from said passage and an exterior cylindrical surface of slightly lesser diameter than the annular interior side wall of said female coupling member; said male coupling member being received within said female coupling member; an annular seal interposed between and sealingly engaging the radial surfaces of both said male and female coupling members, said seal being a flush seal with respect to both said passages; and means securing said male and female coupling members in assembled relation for relative rotary movement.

3. The invention of claim 2 wherein said male coupling member is received within said female coupling member such that said exterior cylindrical surface is adjacent to said annular interior side wall whereby minimal axial displacement of one coupling member relative to the other will cause engagement of said exterior cylindrical surface with said annular interior side wall to preclude further axial displacement thereby maintaining a substantially crevice-free passage through which milk may flow.

4. The invention of claim 2 wherein said rotary coupling is interconnected to said conduits at substantially vertically oriented portions thereof, said conduits further being formed of relatively thin walled tubes whereby said conduits may deflect to accommodate forces tending to cause axial displacement of one coupling member relative to the other.

5. The invention of claim 2 wherein said annular seal includes a locating portion extending longitudinally with respect to said coupling and at least one of said radial surfaces of said male and female coupling members includes a recess for receiving said locating portion to locate said annular seal in a position to provide said flush seal with respect to both said passages.

6. The invention of claim 5 wherein said annular seal gradually tapers to a lesser thickness in the radially outward direction whereby a radially innermost portion of the seal may be compressed between said male and female coupling members and expand during limited axial displacement of one of said coupling members relative to the other to prevent the occurrence of a crevice confronting said passage between said seal and one of said coupling members during such axial displacement.

* * * * *